United States Patent
Holland et al.

(10) Patent No.: US 12,021,899 B2
(45) Date of Patent: Jun. 25, 2024

(54) APPLICATION PROGRAMMING INTERFACE (API) DOMAIN SPECIFIC LANGUAGE

(71) Applicant: NCR Voyix Corporation, Atlanta, GA (US)

(72) Inventors: Christina Holland, Johns Creek, GA (US); Abdul Khaliq Zaheer, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 452 days.

(21) Appl. No.: 17/186,412

(22) Filed: Feb. 26, 2021

(65) Prior Publication Data
US 2022/0279020 A1    Sep. 1, 2022

(51) Int. Cl.
*H04L 9/40* (2022.01)
*G06F 8/30* (2018.01)
*G06F 9/54* (2006.01)

(52) U.S. Cl.
CPC ............... *H04L 63/20* (2013.01); *G06F 8/31* (2013.01); *G06F 9/547* (2013.01)

(58) Field of Classification Search
CPC .................................. H04L 63/20; G06F 8/31
See application file for complete search history.

(56) References Cited

U.S. PATENT DOCUMENTS

| | | | |
|---|---|---|---|
| 10,903,999 B1* | 1/2021 | Raman | H04L 9/14 |
| 11,431,513 B1* | 8/2022 | Cannata | H04L 9/3213 |
| 11,457,040 B1* | 9/2022 | Sole | H04L 63/101 |
| 2017/0346807 A1* | 11/2017 | Blasi | H04L 63/0442 |
| 2020/0007549 A1* | 1/2020 | Gormley | H04L 63/102 |
| 2020/0067903 A1* | 2/2020 | Yegorin | H04L 67/562 |
| 2020/0274900 A1* | 8/2020 | Vaishnavi | H04L 63/0815 |
| 2020/0311729 A1* | 10/2020 | Matthews | G06Q 20/3223 |
| 2022/0131868 A1* | 4/2022 | Vernum | H04L 61/4505 |

FOREIGN PATENT DOCUMENTS

WO    WO-2020088087 A1 *    5/2020

OTHER PUBLICATIONS

Bhawiyuga et al., Architectural Design of Token based Authentication of MQTT Protocol in Constrained IoT Device, 10.1109/TSSA.2017.8272933, IEEE, 2017 (Year: 2017).*

* cited by examiner

*Primary Examiner* — Matthew Smithers
*Assistant Examiner* — Shu Chun Gao
(74) *Attorney, Agent, or Firm* — Schwegman Lundberg & Woessner, P.A.

(57) ABSTRACT

A principal successfully authenticates for a communication session with a target device. One or more Domain Specific Language (DSL) statements/records assigned to the principal are provided to the target device. The target device translates the DSL statements/records into code, which is executed on the target device to custom set security roles of the principal on the target device during the session. In an embodiment, the one or more DSL statements/records are provided to the target device as an optimized JavaScript® Object Notation (JSON) Web Token (JWT); a payload of the optimized JWT comprising the one or more DSL statements/records as a compressed and enhanced JSON object.

14 Claims, 3 Drawing Sheets

APPLICATION PROGRAMMING INTERFACE (API) DOMAIN SPECIFIC LANGUAGE

BACKGROUND

Today's typical enterprise likely manages a variety of servers, endpoint devices, software applications, and users. Security remains a primary concern especially in view of wide scale network connectivity available to devices, applications, users, and customers of the enterprises.

Most enterprises have deployed Role-Based Access Control (RBAC) systems that assign pre-designated security access rights or roles to resources (applications, users, and/or customers) upon successful authentication and sign-in to a given endpoint device.

A prominent technique used by RBAC systems is to provide a token to the endpoint device upon a successful sign-in by a resource to that endpoint device. The token comprises a variety of information, such as a header, a payload, and a digital signature of the authentication service that authenticated the resource during sign-in to the endpoint device. This payload is often expressed as a JavaScript® Object Notation (JSON) object. The token is often a JSON Web Token (JWT). The JSON object payload is comprised of a long series of name-value pairs that set the various roles for the resource that is signing into the endpoint device during a session between the resource (sign-in resource) and other resources (target resources) of the endpoint device.

Over time as the security and specialized needs of the enterprise grow, the size of the JWT token can degrade network and processing performance creating a noticeable time lag between a sign-in request and access to resources of an endpoint device. Moreover, management of the JWT tokens becomes more complex and expensive.

Furthermore, because all the various security roles need to be expressly stated for each sign-in resource with respect to all of the resource's of a given endpoint device in a corresponding JWT, mistakes are commonplace resulting in inadequate access or overly broad access that poses security risks. In fact, enterprises struggle with the complexity of roles and have attempted to minimize proliferation of new specialized roles through role groupings (a group role that represents multiple different other roles). As a result, role over granting to resources is a significant security concern for many enterprises. Additionally, present RBAC systems lack an easy mechanism by which any granted role to a given sign-in resource can be restricted to just records created by that sign-in resource. That is, if a sign-in resource (e.g., a user) is granted a write role (volatile access) to an endpoint resource (e.g., a database), there is no easy way to constrain that write access to just records that the user authored in the database using existing JWTs as a mechanism for enforcement on the endpoint device.

As is apparent, techniques for deploying RBAC systems have become very complex, untoward, and deficient in many respects.

SUMMARY

In various embodiments, methods and a system for processing an API Domain Specific Language (DSL) to set security roles on an endpoint device during a sign-in to that endpoint device are presented.

According to an embodiment, a method for processing an API DSL to set security on an endpoint device is provided. Security roles associated with a principal and an endpoint device are obtained. The security roles are mapped to fields and field values of a Domain Specific Language (DSL) statement/record. A token comprising the DSL statement/record is provided to the endpoint device when the principal successfully logs into the endpoint device for access in order to set the security roles for the principal during an authenticated session with the endpoint device.

DETAILED DESCRIPTION

Figure 1:
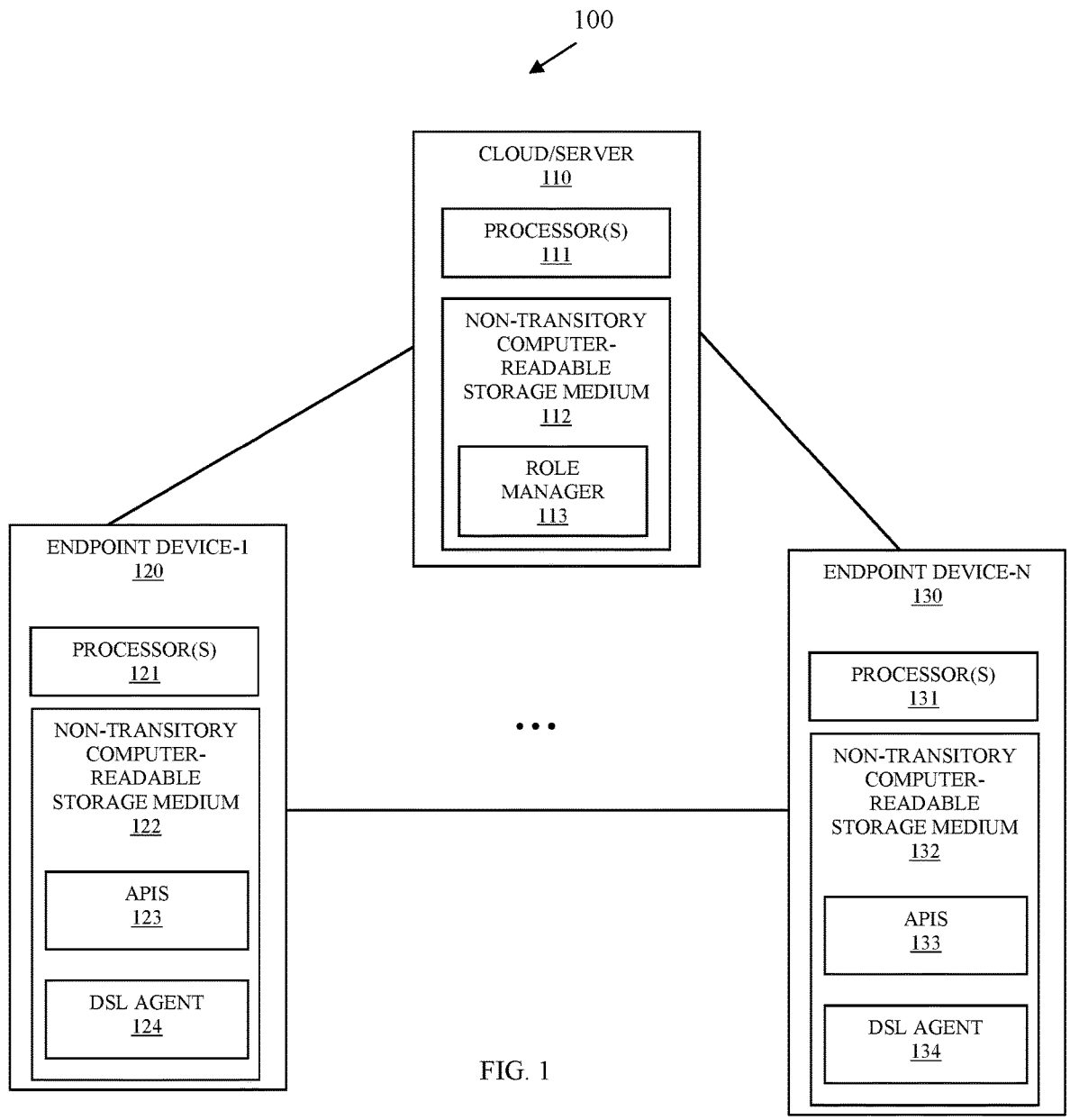
FIG. 1 is a diagram of a system for processing an API DSL to set security roles on an endpoint device, according to an example embodiment.

FIG. 1 is a diagram of a system 100 for processing an API DSL to set security roles on an endpoint device, according to an example embodiment. The system 100 is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from the processing of an API DSL to set security roles on an endpoint device presented herein and below.

Moreover, various components are implemented as one or more software modules, which reside in non-transitory storage and/or hardware memory as executable instructions that when executed by one or more hardware processors perform the processing discussed herein and below.

The techniques, methods, and systems presented herein and below for processing an API DSL to set security roles on an endpoint device can be implemented in all, or some combination of the components shown within one or more hardware computing devices having one or more hardware processors.

As will be illustrated more completely herein and below, system 100 provides a mechanism by which the benefits of JWTs can be maintained and used to set security roles for sign-in resources to an endpoint device while network and processor performance of the endpoint device are substantially improved by optimizing how JWTs are expressed and processed. Access grants (roles) can be expressed and processed from a single compact record/statement for multiple endpoint resources. Role over granting requests can be programmatically rejected, existing role groupings can be maintained, and access can be restricted to just records created by the sign-in resource. Additionally, system 100 can manage access for non-REST (Representational State Transfer) APIs, such that system 100 is not dependent on any open API implementation (but system 100 still works well with any open API implementation and/or RESTful API).

System 100 comprises a cloud/server 110 and a plurality of endpoint devices 120-130 (1 to N endpoint devices).

Cloud/Server 110 comprises a processor 111 and a non-transitory computer-readable storage medium 113. Medium 113 comprises executable instructions for a role manager 113. When the executable instructions are obtained by processor 111, processor 111 is caused to perform operations represented herein and below as role manager 113.

Each endpoint device (120-130) comprises a processor (121-131) and a non-transitory computer readable storage medium (122-132). Medium (122-132) comprises executable instructions for a plurality of APIs 123-133 and a DSL agent 124-134. When the executable instructions are provided to processor 121-131, processor 121-131 is caused to perform operations represented herein and below as APIs 123-133 and DSL agent 124-134.

As used herein a "resource" comprises a principal, a hardware device, a peripheral device, a Virtual Machine (VM), a container, a software application, a system, a data file, or various combinations and/or groupings thereof.

A "principal" is a special type of resource and can comprise a software application and/or user. A principal initiates a login request from one endpoint device-1 120 to another endpoint device-N 130 for purposes of accessing resources of the endpoint device-N 130 during a communication session using a given API 123, which interacts with a corresponding API 133 on endpoint device-N 130.

A DSL is provided with a novel structure for purposes of uniquely identifying approximately 5 different aspects of control for any given RBAC system. The DSL syntax is provided in a format of numbers separated by periods. Each set of numbers are separated by a period and represent one of the approximately different aspects of security roles. A single DSL statement or record can be processed by DSL agent 134 for purposes of setting a plurality of security roles on a target endpoint device-N 130 for a given API 123 used during a login through role manager 113 to target endpoint device-N 130 by a principal of a source endpoint device-1 120.

The DSL statements/records are provided as an optimized JWT after a principal successfully authenticates from a source endpoint device-1 120 to access to a target endpoint device-N 130 by role manager 113. The optimized JWT comprises its normal expected header field, the DSL statement/record, and a digital signature of the authentication authority/service that authenticated the principal for a communication session with the target endpoint device-N 130. The DSL statement/record represents a compressed and enhanced JSON object that is expected after the header field and before the signature field. This DSL statement/record is substantially smaller in size than conventional JSON objects provided with conventional JWTs as payloads. Target DSL agent 134 is configured to grab the DSL statement/record as the payload from the optimized JWT after a successful login by a principal and translate the DSL statement/record into a series of security roles and access rights that are set on target endpoint device-N 130 for the session with the principal.

The novel DSL structure and syntax is as follows:
NNNN.NN.NN.N.N
where the first set of numbers NNNN represents a unique identifier for one of the APIs 123 or 133; the second set of numbers following the first period NN represents a target endpoint device identifier; the third set of numbers following the second period NN represents an action identifier; the fourth set of numbers (note the set can be a set of 1) following the third period N represents a reservation identifier; and the fifth and final set of numbers following the fourth period represents a self-limiting identifier. Each of these different aspects of security roles will now be discussed in turn.

Each of these above-mentioned different aspects of security roles provided in the structure of the DSL will now be discussed in turn.

The API identifier (NNNN and first component field of a given DSL statement/record) uniquely identifies the source endpoint device's API 123 that is being used during a communication session with a target endpoint device 130 (note endpoint device 130 comprises a same API 133 for communication with the source endpoint device 120). This allows for consistent progression between different environments of a given enterprise. Role manager 113 maintains a registry of the API identifiers for APIs 123-134 available through systems of the enterprise. This allows easy linkage and management between software service product lines of the enterprise, support procedures, and documentation. Any newly developed API obtains an API identifier through role manager 113. Furthermore, a login request from an API that is different than what is provided by the Role manager 113 after login in the DSL record/statement can be summarily identified and rejected for any access by the target DSL agent 134.

The target endpoint identifier (NN and second component field of a given DSL statement/record) uniquely identifies the target endpoint device-N 130 that is being accessed by the principal signing in from a source endpoint device-1 120.

The action identifier (NN and third component field of a given DSL statement/record) uniquely corresponds to a given VERB for RESTful APIs, to a given group of VERBs for RESTful APIs, or a unique action identifier for a non-RESTful API. The action identifier provides a role for a given API 123 being used by a principal signing into a target endpoint device-N 130. Some example action identifiers may include: 1 create only; 2 read only; 3 create+read; 4 update only; 5 create+update; 6 read+update; 7 create+read+update; 8 delete only; 9 create+delete; 10 read+delete; 11 create+read+delete; 12 update+delete; 13 create+update+delete; 14 read+update+delete; and 15 create+read+update+delete. It is noted that the two-digit field permits customization on each operation, such as create: post with no query parameters; read: get or a post with query parameters; update: put or patch; delete: delete, etc. Moreover, the numbering scheme can be based on an enterprise's existing scheme to remain consistent with legacy usage of VERBs or action identifiers of the APIs 123-133.

The reservation identifier (N and fourth component of a given DSL statement/record) conveys information about the endpoints and the actions and their relationship to an overall enterprise system. For example, is the target endpoint device 130 available for public consumption/use or is it reserved for system maintenance; if reserved for maintenance, is this reservation for core services or for business type application usage. This type of information would permit enhanced security features that could automatically reject any API call for interactive user access and/or rejected implying system roles or reserved application roles available for public consumption. Some example, reservation identifiers may include: 0 reserved for system level actions; 1 reserved for applications self-care actions only; 2 reserved for enterprise platform consuming applications and systems; 3 reserved for any enterprise system; and 4 available for public consumption. This ensures that over role granting whether intentional or unintentional can be prevented via an appropriate value for the reservation identifier in any given DSL statements issued for a target endpoint device 130. Role manager 113 ensures that a given endpoint device 133 is only issued DSL statements/records in the JWTs for principals have that endpoint's designated reservation identifier value. This is a way of expressing a role for the endpoint device as a whole; rather than from the perspective of the API 123 and principal signing into a target endpoint device-N 130.

The self-limiting identifier (N and fifth and final component of a given DSL statement/record) provides a mechanism to prevent over granting roles to a given principal at a granular level of detail. This is a flag that is set as either 0 or 1 based on the principal that is signing in for access to the target endpoint device-N 130. When not set (value of 0), the principal has access to view records generated by other principals. When set (value of 1), the principal is limited to accessing records self-authored by the principal. Thus, role manager 113 can set this based on the principal to ensure that a principal does not inadvertently perform destructive actions that could impact the organization/enterprise as a whole. Since many enterprises permit delete roles with creation roles and enterprise developers need creation roles, the developers will rarely perform any delete operations out of fear of performing a destructive operation that would proliferate throughout the enterprise. If developers were provided JWTs that prevented any delete operation, which was not self-authored, then many redundant and superfluous records or data structures/objects would not erroneously exist within the enterprise data warehouse making maintenance and a support much easier tasks. The self-limiting identifier provides powerful functionality to role-based security setting following a login by a principal to a target endpoint device-N 130.

The novel DSL also provides syntax which permits wildcarding indicating that all roles associated with a given one of the aspects can be automatically set for a given principal utilizing a given API 123-133. In an embodiment, the wildcard syntax is an asterisk character "*." When the wildcard character is present in one of the fields, the full length of the given fields does not have to be completed. For example, if the action field (each component of the novel DSL may also be referred to as a field or aspect) is to include all available roles for a given principal, then the asterisk is provided in that field as a single character as opposed to the two characters expected in the action field (e.g., DSL statement/record in this case is NNNN.*.NN.N.N). Moreover, multiple fields in a single DSL statement/record can include the wildcard character.

Some example, DSL statements/records are now presented for purposes of illustrating how roles and security are set by a target DSL agent 134 on a target endpoint device-N 130 after a principal has successfully signed into for access from a source endpoint device-1 120.

For purposes of the example DSL statements/records that follow a user (one type of principal) logs into endpoint device having an endpoint device identifier of 2 and the API 133 providing login access through role manager 113 has an API identifier of 22. Role manager 113 upon a successful login by the user to the target endpoint device-N 130 having endpoint device identifier 2 provides the appropriate DSL statements assigned to the authenticated user to the target endpoint device-N 130 where target DSL agent 134 translates the illustrated DSL statements/records into JSON commands that are executed to set the user's security access during the session with target endpoint device-N 130.

The user needs system level access, plus the user needs access to all roles available for public consumption for API 133 having an API identifier of 99, the DSL statements/records for API identifier 22 and API identifier 99 to accommodate these security roles would appear as follows:
22.2.*.4.*
99.*.*.4.*
The user needs system access, and the user needs all read only roles available for public consumption on API identifier 99, the DSL statements/records to accommodate these security roles would appear as follows:
22.2.*.4.*
99.*.3.4.*
The user needs system access, and the user needs all read only roles available for public consumption for all APIs 133 of the target endpoint device-N 130, the DSL statements/records to accommodate these security roles would appear as follows:
22.2.*.4.*
.*.3.4.*
The user needs system access, and the user needs access to all system level reserved roles available for all APIs 133, and the access to all system level reserved roles for all APIs 133 is to be limited to just those self-authored by the user, the DSL statements/records to accommodate these security roles would appear as follows:
22.2.*.4.*
.*.*.0.1

The above-noted examples, if attempted with conventional JWTs would consist of many pages of text, which would need to be sent over the network to the device being logged into and processed. The conventional JWT would comprise a JSON object as a payload comprising numerous noun-VERB pairs for each Role; furthermore, there would be no ability to reflect the self-limiting feature.

System 100 removes these problems associated with conventional JWTs and their conventional JSON object payloads by providing an optimized JWT comprising a payload representing the DSL statement/record. The DSL statement/record provides additional functionality not available to accommodate over granting for the target endpoint device-N 130 as a whole through the reservation field and to accommodate over granting for the principal through the self-limiting field. DSL agent 134 identifies the DSL statements/records as a compressed and enhanced version of a JSON object and translates the fields into code that is executed for purposes of setting the security and roles for a session between the principal and the target endpoint device-N 130.

As used herein, an endpoint device 120-130 may be any computing device capable of connecting to another endpoint device 120-130 through a login via an enterprise server 110. Endpoint devices 120-130 may comprise server devices, clouds, VMs, containers, transaction terminals (Self-Service Terminals (SSTs), Point-Of-Sale (POS) terminals, Automated Teller Machines (ATMs), kiosks, phones, laptops, tablets, desktops, and/or Internet-Of-Things (IoT) devices. That is, the endpoint devices 120-130 comprise any device from which an enterprise provides login and access to for purposes of providing a service/resource.

Additionally, the connecting device that connects to an endpoint device 120-130 need not itself be an endpoint device 120-130 and the connecting device need not have APIs 123-133 or DSL agents 124-134. That is, a principal who is a customer (user) or who is a mobile application of the customer can log into services of enterprise to a specific endpoint device 120-130 and be assigned a given DSL statement/record or set of DSL statements/records by role manager 113 following a successful authentication of the user or mobile application. So, the connecting device operated by the principal does not itself need to be an endpoint device 120-130 under the control of the enterprise. The connecting device may be a mobile device operated by a customer of the enterprise or operated by an employee of the enterprise. The connecting device can therefore be any computing device with network connectivity capabilities (mobile, wearable, integrated into a vehicle, desktop, etc.); and the connecting device may or may not be an endpoint device 120-130.

System 100 permits existing infrastructure associated with JWT login role setting to be maintained and enhanced through an optimized JWT comprising a payload represented by an instance of a novel DSL statement/record. Role manager 113 provides the optimized JWT upon successful login by a principal to an endpoint device 120-130. DSL Agents 124-134 identify the DSL statement/records as a compressed and enhanced version of a JSON object and translate the DSL statement/records into code that executes on the endpoint device 120-130 to set security roles and access rights on the principal during an authorized access session on the endpoint device 120-130. The principal can be a user (customer or employee of the enterprise) or can be an automated program attempting to connection from a connecting device to a given endpoint device 120-130. The novel DSL statement/record comprises the above noted encoded structure (fields and layout) and corresponding syntax (numbers and wild cards) associated with a novel and new DSL, which substantially reduces the size of a conventional JSON object provided with a conventional JWT as a payload. This improves network bandwidth and processor performance on both server 110 and endpoint devices 120-130. Additionally, the encoded structure of the novel DSL statement/record accounts for situations that are either not possible or are difficult to achieve with conventional JWTs, such abilities to restrict over granting roles from a perspective of the endpoint device 120-130 as a whole through the reservation field and from a perspective of the principal as a whole through the self-limiting field.

In an embodiment, values associated with the fields of the novel DSL statements/records can be any character value including numeric and non-numeric characters.

In an embodiment, the novel DSL structure may comprise an additional sixth field or more than six fields. The additional fields may be reserved for further functionality associated with security role setting.

In an embodiment, the novel DSL structure may comprise fewer than 5 or even 4 fields by providing the information conveyed in the fourth and fifth fields (as described above) through special characters appended or prepended to one of the remaining 4 or 3 fields. The special characters are recognized by DSL agents 134 and translated to achieve the role setting access and restrictions provided by the fourth and fifth fields (as described above).

APIs 123-133 may be any application processed for purposes of obtaining access to a resource/service over a network connection.

The embodiments of FIG. 1 and other embodiments are now discussed with reference to FIGS. 2-3.

Figure 2:
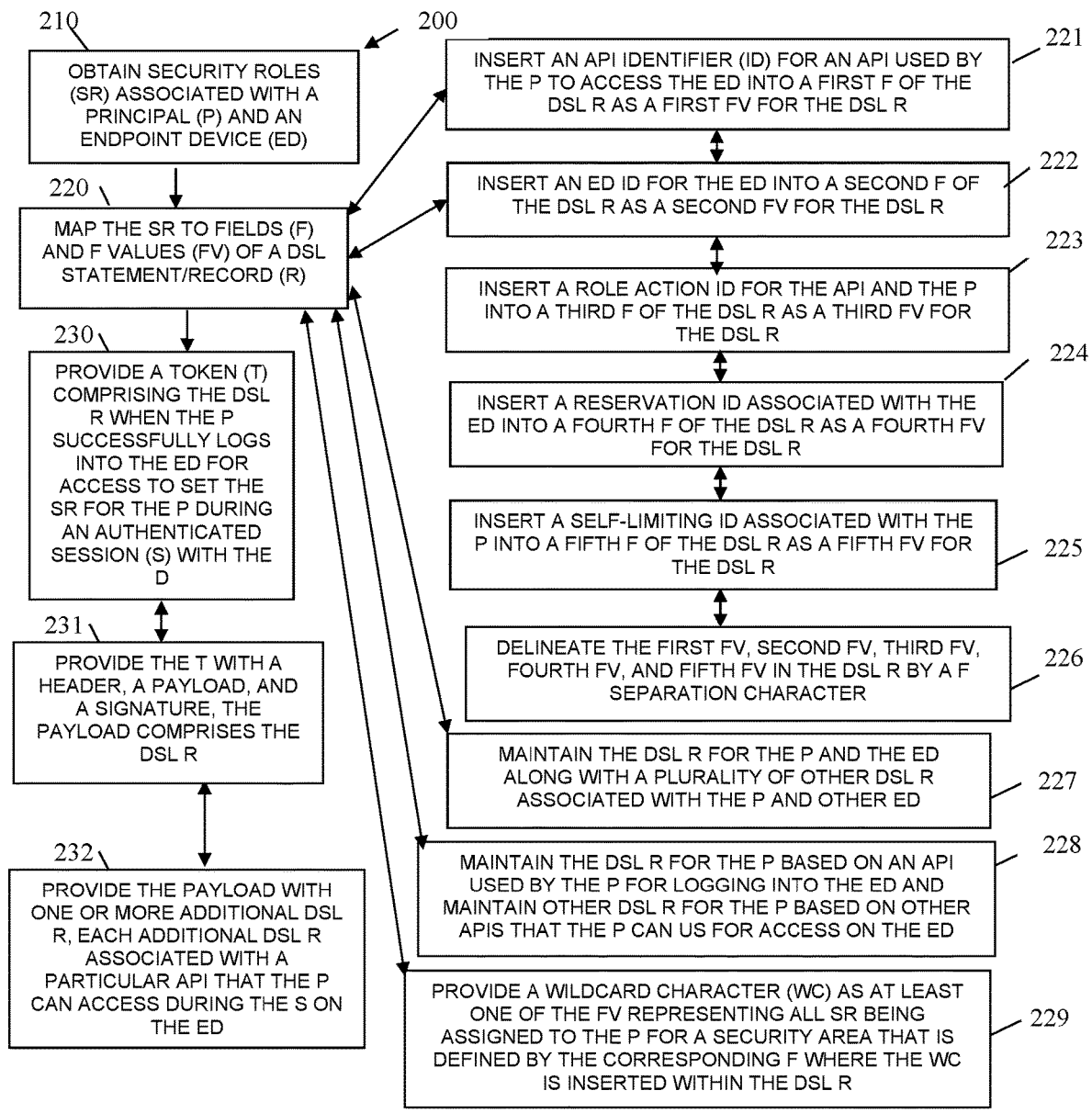
FIG. 2 is a diagram of a method for processing an API DSL to set security roles on an endpoint device, according to an example embodiment.

FIG. 2 is a diagram of a method 200 for processing an API DSL to set security roles on an endpoint device, according to an example embodiment. The software module(s) that implements the method 200 is referred to as a "role manager." The role manager is implemented as executable instructions programmed and residing within memory and/or a non-transitory computer-readable (processor-readable) storage medium and executed by one or more hardware processors of one or more hardware computing devices. The processors of the devices that execute the role manager are specifically configured and programmed to process the role manager. The role manager has access to one or more networks during its processing. The networks can be wired, wireless, or a combination of wired and wireless.

In an embodiment, the device that executes the role manager is a cloud/server 110. In an embodiment the device that executes the role manager is a server 110. In an embodiment, a plurality of servers cooperate to execute the role manager from one logical cloud server 110.

In an embodiment, the role manager is role manager 113 discussed above with system 100.

At 210, the role manager obtains security roles associated with a principal and an endpoint device. This may be obtained using an interface or an API to a security system for an enterprise.

At 220, the role manager maps the security roles to fields and field values of a DSL statement/record.

In an embodiment, at 221, the role manager inserts an API identifier for an API used by the principal to access the endpoint device into a first field of the DSL statement/record as a first field value for the DSL statement/record.

In an embodiment of 221 at 222, the role manager inserts an endpoint device identifier for the endpoint device into a second field of the DSL statement/record as a second field value for the DSL statement/record.

In an embodiment of 222 and at 223, the role manager inserts a role action identifier for the API and the principal into a third field of the DSL statement/records as a third field value for the DSL statement/record.

In an embodiment of 223 and at 224, the role manager inserts a reservation identifier associated with the endpoint device into a fourth field of the DSL statement/record as a fourth field value for the DSL statement/record.

In an embodiment of 224 and at 225, the role manager inserts a self-limiting identifier associated with the principal into a fifth field of the DSL statement/record as a fifth field value for the DSL statement/record.

In an embodiment of 225 and at 226, the role manager delineates the first field value, the second field value, the third field value, the fourth field value, and the fifth field value in the DSL statement/record by a field-separation character (such as the period "." discussed above with FIG. 1 and system 100).

In an embodiment, at 227, the role manager maintains the DSL statement/record for the principal and the endpoint device along with a plurality of other DSL statements/records associated with the principal and other endpoint devices.

In an embodiment, at 228, the role manager maintains the DSL statement/records for the principal based on an API used by the principal for logging into the endpoint device and maintains other DSL statements/records for the principal based on other APIs that the principal can used for access on the endpoint device.

In an embodiment, at 229, the role manager provides a wildcard character as at least one field value representing all security roles being assigned to the principal for a security area that is defined by the corresponding field where the wildcard character is inserted within the DSL statement/record (wildcard character may be the asterisk "*" discussed above with FIG. 1 and system 100).

At 230, the role manager provides a token comprising the DSL statement/record when the principal successfully logs into the endpoint device for access to set security roles for the principal during an authenticated session with the endpoint device.

In an embodiment, at 231, the role manager provides the token with a header, a payload, and a signature. The payload comprises the DSL statement/record.

In an embodiment of 231 and at 232, the role manager provides the payload with one or more additional DSL statements/records. Each additional DSL statement/record associated with a particular API that the principal can access during the session on the endpoint device.

In an embodiment of 232, the token is an optimized JWT and the payload is a compressed and enhanced version of a JSON object.

Figure 3:
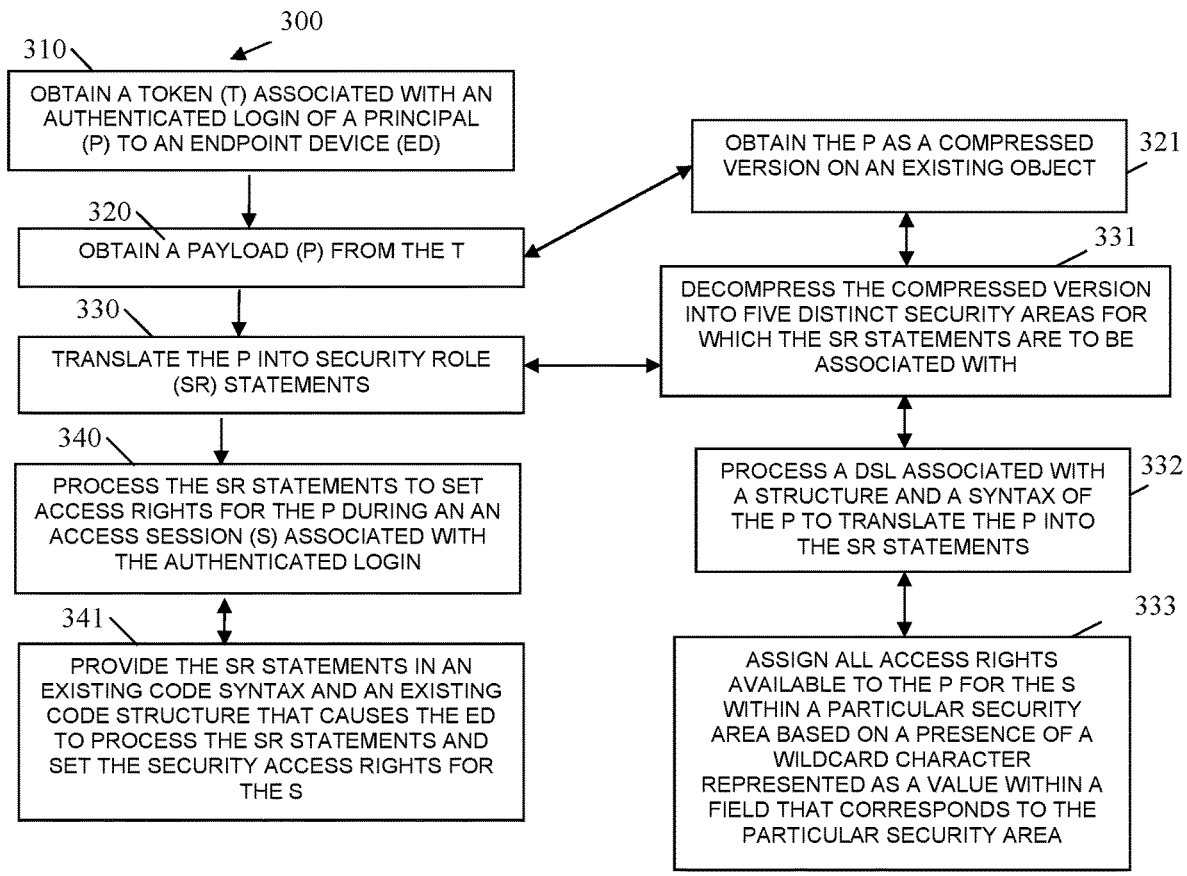
FIG. 3 is a diagram of another method for processing an API DSL to set security roles on an endpoint device, according to an example embodiment.

FIG. 3 is a diagram of another method 300 for processing an API DSL to set security roles on an endpoint device, according to an example embodiment. The software module(s) that implements the method 300 is referred to as a "DSL agent." The DSL agent is implemented as executable instructions programmed and residing within memory and/or a non-transitory computer-readable (processor-readable) storage medium and executed by one or more hardware processors of one or more hardware devices. The processors of the devices that execute the DSL agent are specifically configured and programmed to process the DSL agent. The DSL agent has access to one or more networks during its processing. The networks can be wired, wireless, or a combination of wired and wireless.

The DSL agent interacts with the method 200 during a login of a principal to the device that processes the DSL agent for purposes of setting security access rights and roles on the principal during an authenticated access by the principal to the device.

In an embodiment, the device that executes the DSL agent is 120 or 130.

In an embodiment, the DSL agent is DSL agent 124 or DSL agent 134.

In an embodiment, the device that executes the DSL agent is a server, a cloud, a VM, a container, an SST, a POS terminal, an ATM, a kiosk, a phone, a tablet, a laptop, a desktop, a wearable processing device, or an IoT device.

At 310, the DSL agent obtains a token associated an authenticated login of a principal to an endpoint device.

At 320, the DSL agent obtains a payload from the token.

In an embodiment, at 321, the DSL agent obtains the payload as a compressed version of an existing object (e.g., a JSON object).

At 330, the DSL agent translates the payload into security role statements.

In an embodiment of 321 and 330, at 331, the DSL agent decompresses the compressed version into five distinct security areas for which the security role statements are to be associated with.

In an embodiment of 331 and at 332, the DSL agent processes a DSL associated with a structure and a syntax of the payload to translate the payload into the security role statements.

In an embodiment of 332 and at 333, the DSL agent assigns all access rights available to the principal for an access session within a particular security area based on a presence of a wildcard character represented as a value within a field that corresponds to the particular security area.

At 340, the DSL agent processes the security role statements to set access rights for the principal during the access session associated with the authenticated login.

In an embodiment, at 341, the DSL agent provides the security role statements in an existing code syntax and an existing code structure that causes the endpoint device to process the security role statements and set the security access rights for the access session.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
obtaining security roles associated with a principal and an endpoint device;
mapping the security roles to fields and field values of a Domain Specific Language (DSL) statement/record, wherein mapping further includes inserting an Application Programming Interface (API) identifier for an API used by the principal to access the endpoint device into a first field of the DSL statement/record as a first field value for the DSL statement/record, wherein mapping further includes inserting an endpoint identifier for the endpoint device into a second field of the DSL statement/record as a second field value for the DSL statement/record; and
providing a token comprising the DSL statement/record to the endpoint device when the principal successfully logs into the endpoint device for access in order to set the security roles for the principal during an authenticated session with the endpoint device.

2. The method of claim 1, wherein mapping further includes inserting a role action identifier for the API and the principal into a third field of the DSL statement/record as a third field value for the DSL statement/record.

3. The method of claim 2, wherein mapping further includes inserting a reservation identifier associated with the endpoint device into a fourth field of the DSL statement/record as a fourth field value for the DSL statement/record.

4. The method of claim 3, wherein mapping further includes inserting a self-limiting identifier associated with principal into a fifth field of the DSL statement/record as a fifth field value for the DSL statement/record.

5. The method of claim 4, wherein mapping further includes delineating the first field value, the second field value, the third field value, the fourth field value, and the fifth field value in the DSL statement/record by a field-separation character.

6. The method of claim 1, wherein mapping further includes maintaining the DSL statement/record for the principal and the endpoint device along with a plurality of other DSL statements/records associated with the principal and other endpoint devices.

7. The method of claim 1, wherein mapping further includes maintaining the DSL statement/record for the principal based on the API used by the principal for logging into the endpoint device and maintaining other DSL statements/records for the principal based on other APIs that the principal can use for access the endpoint device.

8. The method of claim 1, wherein mapping further includes providing a wildcard character as at least one of the field values representing all security roles being assigned to the principal for a security area that is defined by the corresponding field where the wildcard character is inserted within the DSL statement/record.

9. The method of claim 1, wherein providing further includes providing the token with a header, a payload, and a signature to the endpoint device, wherein the payload comprises the DSL statement/record.

10. The method of claim 9 further comprising, providing the payload with one or more additional DSL statements/records for the principal, each additional DSL statements/records associated with a particular Application Programming Interface (API) that the principal may access during the authenticated session on the endpoint device.

11. A method, comprising:
obtaining a token associated with an authenticated login of a principal to an endpoint device;
obtaining a payload from the token, wherein obtaining the payload further includes obtaining the payload as a compressed version of an existing object;
translating the payload into security role statements, wherein translating the payload further includes decompressing the compressed version into five distinct security areas for which the security role statements are to be associated with; and
processing the security role statements on the endpoint device to set security access rights for the principal during an access session associated with the authenticated login.

12. The method of claim 11, wherein decompressing further includes processing a Domain Specific Language (DSL) associated with a structure and a syntax of the payload to translate the payload into the security role statements.

13. The method of claim 12, wherein translating further includes assigning all access rights to the principal for the access session within a particular security area based on a presence of a wildcard character represented as a value within a field that corresponds to the particular security area.

14. The method of claim 11, wherein processing further includes providing the security role statements in an existing code syntax and an existing code structure that causes the endpoint device to process the security role statements and set the security access rights for the access session.

* * * * *